United States Patent
Sethia

(10) Patent No.: US 12,147,967 B2
(45) Date of Patent: Nov. 19, 2024

(54) DYNAMIC NFT-BASED FRICTIONLESS TRANSACTION SYSTEM

(71) Applicant: Bank of America Corporation, Charlotte, NC (US)

(72) Inventor: Maneesh Sethia, Telangana (IN)

(73) Assignee: Bank of America Corporation, Charlotte, NC (US)

( * ) Notice: Subject to any disclaimer, the term of this patent is extended or adjusted under 35 U.S.C. 154(b) by 4 days.

(21) Appl. No.: 17/875,166

(22) Filed: Jul. 27, 2022

(65) Prior Publication Data

US 2024/0037530 A1 Feb. 1, 2024

(51) Int. Cl.
*G06Q 20/32* (2012.01)
*G06Q 20/38* (2012.01)
*G06Q 20/40* (2012.01)

(52) U.S. Cl.
CPC ....... *G06Q 20/3224* (2013.01); *G06Q 20/389* (2013.01); *G06Q 20/4014* (2013.01)

(58) Field of Classification Search
CPC ............. G06Q 20/2324; G06Q 20/389; G06Q 20/4014
USPC .................................................. 705/35, 44
See application file for complete search history.

(56) References Cited

U.S. PATENT DOCUMENTS

| | | | |
|---|---|---|---|
| 10,049,402 B1 | 8/2018 | Miranda | |
| 10,510,065 B2 | 12/2019 | Benkreira et al. | |
| 10,777,047 B1 | 9/2020 | Hamchuck et al. | |
| 11,257,067 B1 | 2/2022 | Yang et al. | |
| 11,443,838 B1 * | 9/2022 | Cordonnier | G16H 10/65 |
| 11,875,323 B2 * | 1/2024 | Singh | G06Q 20/322 |
| 2018/0165663 A1 | 6/2018 | Naik et al. | |
| 2019/0286805 A1 | 9/2019 | Law et al. | |
| 2022/0215375 A1 | 7/2022 | Gupta | |
| 2022/0407702 A1 * | 12/2022 | Jakobsson | H04L 9/50 |
| 2023/0079127 A1 * | 3/2023 | Benedetto | A63F 13/69 |
| 2023/0087841 A1 * | 3/2023 | Read | H04L 9/3247 705/51 |
| 2023/0122552 A1 * | 4/2023 | Meyers | H04L 9/3228 463/29 |
| 2023/0177489 A1 * | 6/2023 | Chan | G06Q 20/3672 705/66 |

* cited by examiner

*Primary Examiner* — William E Rankins
(74) *Attorney, Agent, or Firm* — Banner & Witcoff, Ltd.

(57) ABSTRACT

A wearable computing device, such as a smart glass device, may be used to facilitate touchless and/or frictionless transactions at computing devices in the vicinity of the wearable computing device based on a dynamic non-fungible token (NFT). The smart glass device captures biometric information of a user, such as an iris image, and generates the NFT based on the biometric information, a geographic location and a time. The NFT is authenticated via a blockchain by an authentication system at a remote network. Upon validation, the smart glass device presents user interface screens to initiate the transaction. A computing device receives a request message to complete the transaction based on the NFT.

20 Claims, 6 Drawing Sheets

DYNAMIC NFT-BASED FRICTIONLESS TRANSACTION SYSTEM

BACKGROUND

Aspects of the disclosure relate to computer hardware and software. In particular, one or more aspects of the disclosure generally relate to facilitating a touchless electronic transaction via a smart glass application and a dynamic non-fungible token (NFT).

A need has been recognized to improve and enhance capabilities of computer systems incorporating transaction action points, such as Automated Teller Machines (ATM's) to address deficiencies of traditional approaches to better satisfy user needs and/or to enhance security capabilities.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary presents some concepts of the disclosure in a simplified form as a prelude to the description below.

Aspects of the disclosure relate to computer systems that provide effective, efficient, scalable, and convenient ways of securely and uniformly managing how internal computer systems exchange information with external computer systems to provide and/or support different products and services offered by an organization (e.g., a financial institution, and the like).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes provide a substantially touch-less ATM transaction process and/or a substantially touchless merchant transaction process. In some cases, this process provides a digital interaction interface using technology that enable financial transactions to complete seamlessly at any ATM and/or merchant transaction device. Over the past few years, public health threats and/or emergency situations has changed the way consumers desire to interact with public computing devices used for conducting electronic transactions.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1A:
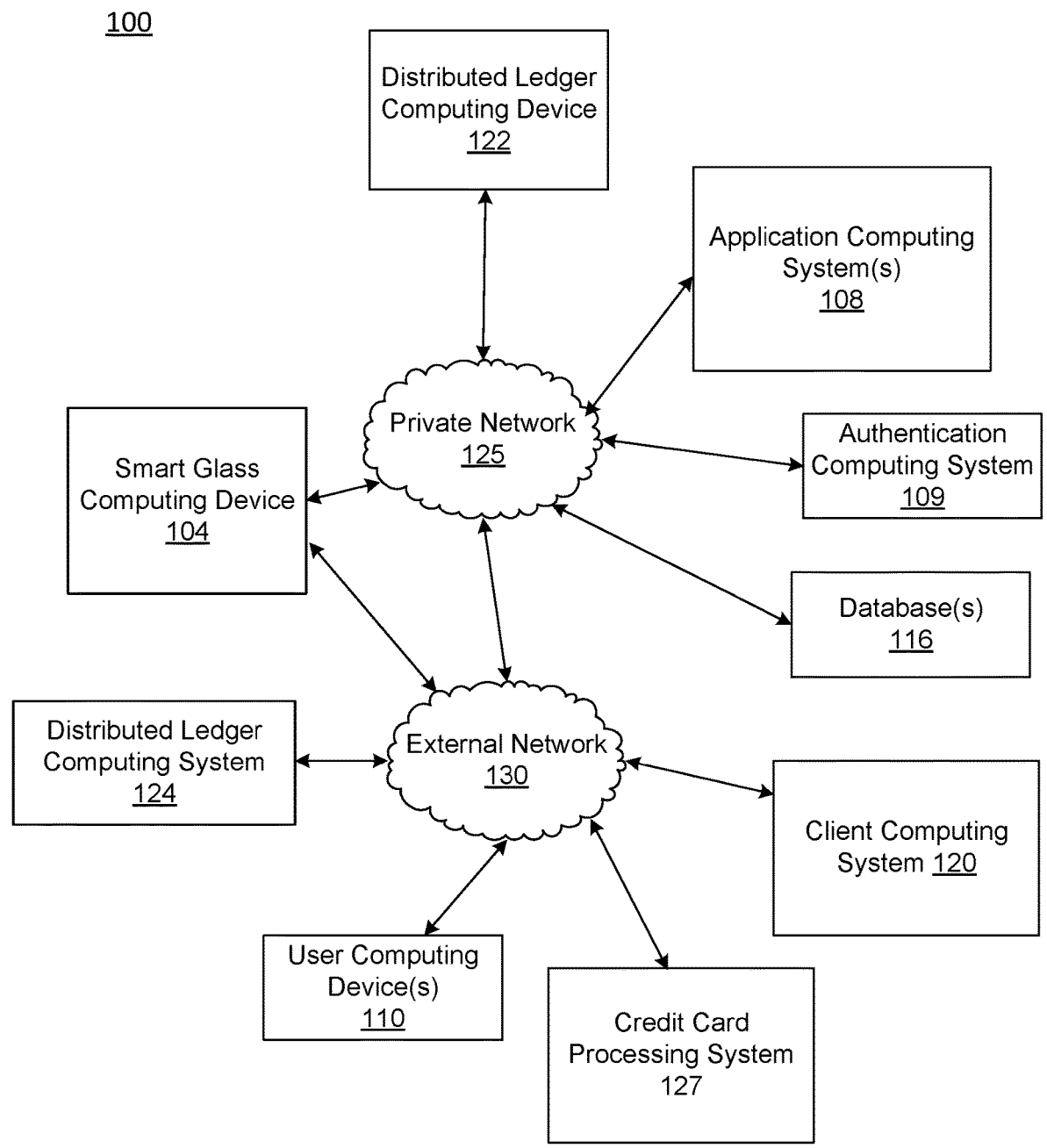
FIG. 1A shows an illustrative computing environment for smart glass implementation of a dynamic NFT to facilitate touchless transactions, in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As used throughout this disclosure, computer-executable "software and data" can include one or more: algorithms, applications, application program interfaces (APIs), attachments, big data, daemons, emails, encryptions, databases, datasets, drivers, data structures, file systems or distributed file systems, firmware, graphical user interfaces, images, instructions, machine learning (e.g., supervised, semi-supervised, reinforcement, and unsupervised), middleware, modules, objects, operating systems, processes, protocols, programs, scripts, tools, and utilities. The computer-executable software and data is on tangible, computer-readable memory (local, in network-attached storage, or remote), can be stored in volatile or non-volatile memory, and can operate autonomously, on-demand, on a schedule, and/or spontaneously.

"Computer machines" can include one or more: general-purpose or special-purpose network-accessible administrative computers, clusters, computing devices, computing platforms, desktop computers, distributed systems, enterprise computers, laptop or notebook computers, primary node computers, nodes, personal computers, portable electronic devices, servers, node computers, smart devices, tablets, and/or workstations, which have one or more microprocessors or executors for executing or accessing the computer-executable software and data. References to computer machines and names of devices within this definition are used interchangeably in this specification and are not considered limiting or exclusive to only a specific type of device. Instead, references in this disclosure to computer machines and the like are to be interpreted broadly as understood by skilled artisans. Further, as used in this specification, computer machines also include all hardware and components typically contained therein such as, for example, processors, executors, cores, volatile and non-volatile memories, communication interfaces, etc.

Computer "networks" can include one or more local area networks (LANs), wide area networks (WANs), the Internet, wireless networks, digital subscriber line (DSL) networks, frame relay networks, asynchronous transfer mode (ATM) networks, virtual private networks (VPN), or any combination of the same. Networks also include associated "network equipment" such as access points, ethernet adaptors (physical and wireless), firewalls, hubs, modems, routers, and/or switches located inside the network and/or on its periphery, and software executing on the foregoing.

The above-described examples and arrangements are merely some examples of arrangements in which the systems described herein may be used. Various other arrangements employing aspects described herein may be used without departing from the innovative concepts described.

A smart glass based interactive solution provides a customer freedom to interact with an ATM and/or a point of sale (POS) computing device in a seamless way. The smart glass solution utilizes a unique dynamic NFT, where the smart glass device captures geographical coordinates from a geolocation device and communicates via a near field communication (NFC) device reader in real time. The smart glass may utilize user biometrics (e.g., an iris scan) to further facilitate secure transactions, such as by imaging an eye and combining determined user biometric information with the captured geographical coordinates and a timestamp to generate a NFT corresponding to the biometric information. The NFT may be valid for a specified duration and may be communicated via a wireless communication network, such as the NFC. An enterprise network may include a database server that receives the dynamic NFT and, using a blockchain or other distributed ledger service, match the record at the network application service end to complete authentication. Results of the authentication may be communicated to the smart glass device for display to the user in the NFT format, to allow for initiation of the transaction at the ATM or POS device. Using the smart glass, the user may navigate one or more user interface screens, such as by controlling scrolling by eye movements and/or selecting options via an eye blink and/or a button press. Using such methods, the smart glass user may initiate and/or process an electronic transaction and/or may log out when done. By using this method, the user may initiate touchless transactions at publicly available computing devices, such as ATMs, point of sale devices, electronic kiosks, vending machines, and/or the like, while minimizing or eliminating physical contact with the devices.

FIG. 1A shows an illustrative computing environment 100 for smart glass implementation of a dynamic NFT to facilitate touchless transactions, in accordance with one or more arrangements. The computing environment 100 may comprise one or more devices (e.g., computer systems, communication devices, and the like). The computing environment 100 may comprise, for example, a smart glass computing device 104, one or more application system 108, an authentication computing system 109, one or more database(s) 116 and/or a distributed ledger computing device 122 that may be a portion of a distributed ledger computing system 124. The one or more of the devices and/or systems, may be linked over a private network 125 associated with an enterprise organization (e.g., a financial institution, a business organization, an educational institution, a governmental organization and the like). In some cases, the smart glass computing device 104 may communicate via a public network, such as the external network 130. The computing environment 100 may additionally comprise a client computing system 120, the distributed ledger computing system 124, a credit card processing system 127, and one or more user devices 110 connected, via a public network 130, to the devices in the private network 125. The devices in the computing environment 100 may transmit/exchange/share information via hardware and/or software interfaces using one or more communication protocols. The communication protocols may be any wired communication protocol(s), wireless communication protocol(s), one or more protocols corresponding to one or more layers in the Open Systems Interconnection (OSI) model (e.g., local area network (LAN) protocol, an Institution of Electrical and Electronics Engineers (IEEE) 802.11 WIFI protocol, a $3^{rd}$ Generation Partnership Project (3GPP) cellular protocol, a hypertext transfer protocol (HTTP), etc.). While FIG. 1A shows the authentication computing system 109 as being separate from the application computing systems 108, the authentication computing system 109 may be implemented as a component of one or more of the application computing systems 108.

The smart glass computing device 104 may comprise one or more computing devices and/or other computer components (e.g., processors, memories, communication interfaces) configured to perform one or more functions as described herein. Further details associated with the architecture of the smart glass computing device 104 are described with reference to FIG. 1B. The smart glass computing device 104 may communicate via one or more networks, such as near field communication networks to a device local to the smart glass computing device 104. For example, a connection may be made locally by the smart glass computing device 104 between a self-service transaction device (e.g., an ATM, a vending machine, a kiosk, and/or the like) or a point of sale device at a location local to the smart glass computing device 104. In some cases, the smart glass computing device may connect via a network, such as the private network 125 or the external network 130, to one or more computing devices to facilitate an electronic transaction.

The application system 108 and/or the client system 122 may comprise one or more computing devices and/or other computer components (e.g., processors, memories, communication interfaces). In addition, the application computing systems 108 and/or the authentication computing system 109 may be configured to host, execute, and/or otherwise provide one or more enterprise applications. In some cases, the application systems 108 may host one or more services configured facilitate operations requested through one or more API calls, such as data retrieval and/or initiating processing of specified functionality. In some cases, a client computing system may be configured to communicate with one or more of the application systems 108 such as via direct communications and/or API function calls and the services. In an arrangement where the private network 125 is associated with a financial institution (e.g., a bank), the application computing systems 108 may be configured, for example, to host, execute, and/or otherwise provide one or more transaction processing programs, such as an online banking application, fund transfer applications, and/or other programs associated with the financial institution. The client computing system and/or the application computing systems 108 may comprise various servers and/or databases that store and/or otherwise maintain account information, such as financial account information including account balances, transaction history, account owner information, and/or other information. In addition, the client computing system and/or the application computing systems 108 may process and/or otherwise execute transactions on specific accounts based on commands and/or other information received from other computer systems comprising the computing environment 100. In some cases, one or more of the client computing system and/or the application computing systems 108 may be configured, for example, to host, execute, and/or otherwise provide one or more transaction processing programs, such as electronic fund transfer applications, online loan processing applications, and/or other programs associated with the financial institution.

The application computing systems 108 may be one or more host devices (e.g., a workstation, a server, and the like) or mobile computing devices (e.g., smartphone, tablet). In addition, an application systems 108 may be linked to and/or operated by a specific enterprise user (who may, for example, be an employee or other affiliate of the enterprise organization) who may have administrative privileges to perform various operations within the private network 125. In some cases, the application computing systems 108 may be capable of performing one or more layers of user identification based on one or more different user verification technologies including, but not limited to, password protection, pass phrase identification, biometric identification, voice recognition, facial recognition and/or the like. In some cases, a first level of user identification may be used, for example, for logging into an application or a web server and a second level of user identification may be used to enable certain activities and/or activate certain access rights.

The client computing system 120 may comprise one or more computing devices and/or other computer components (e.g., processors, memories, communication interfaces). The client computing system 120 may be configured, for example, to host, execute, and/or otherwise provide one or more transaction processing programs, such as goods ordering applications, electronic fund transfer applications, online loan processing applications, and/or other programs associated with providing a product or service to a user. With reference to the example where the client computing system 120 is for processing an electronic exchange of goods and/or services. The client computing system 120 may be associated with a specific goods purchasing activity, such as purchasing a product, purchasing a vehicle, transferring title of real estate may perform communicate with one or more other platforms within the client computing system 120. In some cases, the client computing system 120 may integrate API calls to request data, initiate functionality, or otherwise communicate with the one or more application computing systems 108, such as via the services. For example, the services may be configured to facilitate data communications (e.g., data gathering functions, data writing functions, and the like) between the client computing system 120 and the one or more application computing systems 108.

The user device(s) 110 may be computing devices (e.g., desktop computers, laptop computers) or mobile computing device (e.g., smartphones, tablets) connected to the network 125. The user device(s) 110 may be configured to enable the user to access the various functionalities provided by the devices, applications, and/or systems in the network 125.

The database(s) 116 may comprise one or more computer-readable memories storing information that may be used by the smart glass computing device 104. For example, the database(s) 116 may store biometric information or other identification information used to authenticate a user, such as the user of the smart glass computing device 104, and the like. In an arrangement, the database(s) 116 may be used for other purposes as described herein. In some cases, the client computing system 120 may write data or read data to the database(s) 116 via the services.

The distributed ledger computing device 122 may be a component of a decentralized peer-to-peer (e.g., P2P) system specialized for the purpose of managing and/or participating as part of a blockchain, or other distributed networks. The decentralized P2P system may be comprised of computing devices that are distributed in multiple locations across a geographical area as opposed to a single location such as a business or company. The computing devices forming the decentralized P2P system may operate with each other to manage a blockchain, which may be a data structure used to store information related to the decentralized P2P system. More specifically, the blockchain may be a chronological linkage of data elements (e.g., blocks) which store data records relating to the decentralized computing system.

A user may access the decentralized P2P system through a specialized "wallet" that serves to uniquely identify the user and enable the user to perform functions related to the decentralized P2P network. Through the wallet, the user may be able to hold tokens, funds, or any other asset associated with the decentralized P2P system. Furthermore, the user may be able to use the wallet to request performance of network-specific functions related to the decentralized P2P system such as fund, token, asset transfers and/or user authentication. The various computing devices forming the decentralized P2P computing system may operate as a team to perform network-specific functions requested by the user. In performing the network-specific functions, the various computing devices may produce blocks that store the data generated during the performance of the network-specific functions and may add the blocks to the blockchain. After the block has been added to the blockchain, the wallet associated with the user may indicate that the requested network-specific function has been performed.

In more detail, the decentralized P2P system may be specialized for the purpose of managing a distributed ledger, such as a private blockchain or a public blockchain, through the implementation of digital cryptographic hash functions, consensus algorithms, digital signature information, and network-specific protocols and commands. The decentralized P2P system (e.g., decentralized system) may be comprised of decentralized system infrastructure consisting of a plurality of computing devices, either of a heterogeneous or homogenous type, which serve as network nodes (e.g., full nodes and/or lightweight nodes) to create and sustain a decentralized P2P network (e.g., decentralized network). Each of the full network nodes may have a complete replica or copy of a blockchain stored in memory and may operate in concert, based on the digital cryptographic hash functions, consensus algorithms, digital signature information, and network-specific protocols, to execute network functions and/or maintain inter-nodal agreement as to the state of the blockchain. Each of the lightweight network nodes may have at least a partial replica or copy of the blockchain stored in memory and may request performance of network functions through the usage of digital signature information, hash functions, and network commands. In executing network functions of the decentralized network, such as balance sheet transactions and smart contract operations, at least a portion of the full nodes forming the decentralized network may execute the one or more cryptographic hash functions, consensus algorithms, and network-specific protocols to register a requested network function on the blockchain. In some instances, a plurality of network function requests may be broadcasted across at least a portion of the full nodes of the decentralized network, aggregated through execution of the one or more digital cryptographic hash functions, and validated by performance of the one or more consensus algorithms to generate a single work unit (e.g., block), which may be added in a time-based, chronological manner to the blockchain through performance of network-specific protocols.

While in practice the term "blockchain" may hold a variety of contextually derived meanings, the term blockchain, as used herein, refers to a concatenation of sequentially dependent data elements (e.g., blocks) acting as a data ledger that stores records relating to a decentralized computing system. Such data records may be related to those used by a particular entity or enterprise, such as a financial institution, and/or may be associated with a particular application and/or use case including, but not limited to, cryptocurrency, digital content storage and delivery, entity authentication and authorization, digital identity, marketplace creation and operation, internet of things (e.g., IoT), prediction platforms, election balloting, health records, currency exchange and remittance, P2P transfers, ride sharing, electronic entertainment, trading platforms, and real estate, precious metal, and work of art registration and transference, among others. A "private blockchain" may refer to a blockchain of a decentralized private system in which only authorized computing devices are permitted to act as nodes in a decentralized private network and have access to the private blockchain. In some instances, the private blockchain may be viewable and/or accessible by authorized computing devices which are not participating as nodes within the decentralized private network, but still have proper credentials. A "public blockchain" may refer to a blockchain of a decentralized public system in which any computing devices may be permitted to act as nodes in a decentralized public network and have access to the public blockchain. In some instances, the public blockchain may be viewable and/or accessible by computing devices which are not participating as nodes within the decentralized public network.

Further, a "full node" or "full node computing device," as used herein, may describe a computing device in a decentralized system which operates to create and maintain a decentralized network, execute requested network functions, and maintain inter-nodal agreement as to the state of the blockchain. In order to perform such responsibilities, a computing device operating as a full node in the decentralized system may have a complete replica or copy of the blockchain stored in memory, as well as executable instructions for the execution of hash functions, consensus algorithms, digital signature information, network protocols, and network commands. A "lightweight node," "light node," "lightweight node computing device," or "light node computing device" may refer to a computing device in a decentralized system, which operates to request performance of network functions (e.g., balance sheet transactions, smart contract operations, and the like) within a decentralized network but without the capacity to execute requested network functions and maintain inter-nodal agreement as to the state of the blockchain. As such, a computing device operating as a lightweight node in the decentralized system may have a partial replica or copy of the blockchain. In some instances, network functions requested by lightweight nodes to be performed by the decentralized network may also be able to be requested by full nodes in the decentralized system.

"Network functions" and/or "network-specific functions," as described herein, may relate to functions which are able to be performed by nodes of a decentralized P2P network. In some arrangements, the data generated in performing network-specific functions may or may not be stored on a blockchain associated with the decentralized P2P network. Examples of network functions may include "smart contract operations," "balance sheet transactions," and/or user data authentication. A smart contract operation, as used herein, may describe one or more operations performed by a "smart contract," which may be one or more algorithms and/or programs associated with one or more nodes within a decentralized P2P network. A balance sheet transaction may describe one or more changes to data holdings associated with one or more nodes within a decentralized network.

In one or more aspects of the disclosure, a "digital cryptographic hash function," as used herein, may refer to any function which takes an input string of characters (e.g., message), either of a fixed length or non-fixed length, and returns an output string of characters (e.g., hash, hash value, message digest, digital fingerprint, digest, and/or checksum) of a fixed length. Examples of digital cryptographic hash functions may include BLAKE (e.g., BLAKE-256, BLAKE-512, and the like), MD (e.g., MD2, MD4, MD5, and the like), Scrypt, SHA (e.g., SHA-1, SHA-256, SHA-512, and the like), Skein, Spectral Hash, SWIFT, Tiger, and so on. A "consensus algorithm," as used herein and as described in further detail below, may refer to one or more algorithms for achieving agreement on one or more data values among nodes in a decentralized network. Examples of consensus algorithms may include proof of work (e.g., PoW), proof of stake (e.g., PoS), delegated proof of stake (e.g., DPoS), practical byzantine fault tolerance algorithm (e.g., PBFT), and so on. Furthermore, "digital signature information" may refer to one or more private/public key pairs and digital signature algorithms which are used to digitally sign a message and/or network function request for the purposes of identity and/or authenticity verification. Examples of digital signature algorithms which use private/public key pairs contemplated herein may include public key infrastructure (PKI), Rivest-Shamir-Adleman signature schemes (e.g., RSA), digital signature algorithm (e.g., DSA), Edwards-curve digital signature algorithm, and the like. A "wallet," as used herein, may refer to one or more data and/or software elements (e.g., digital cryptographic hash functions, digital signature information, and network-specific commands) that allow a node in a decentralized P2P network to interact with the decentralized P2P network.

A decentralized P2P system implementing a blockchain data structure may provide solutions to technological problems existing in current centralized system constructs with traditional data storage arrangements. For example, conventional data storage arrangements that use a central data authority have a single point of failure (namely, the central storage location) which, if compromised by a malicious attacker, can lead to data tampering, unauthorized data disclosure, and unauthorized use and/or loss of operative control of the processes performed by the centralized system. The implementation of a blockchain data structure in a decentralized P2P system acts as a safeguard against unreliable and/or malicious nodes acting in the decentralized P2P network to undermine the work efforts of the other nodes, e.g., by providing byzantine fault tolerance within the network.

In one or more arrangements, the smart glass computing device 104, the one or more application systems 108, the authentication computing system 109, the one or more database(s) 116, the distributed ledger computing device 122, the client computing system 120, the distributed ledger computing system 124, the credit card processing system 127, the one or more user devices 110, and/or the other devices/systems in the computing environment 100 may be any type of computing device capable of receiving input via a user interface, and communicating the received input to one or more other computing devices in the computing environment 100. For example, the smart glass computing device 104, the one or more application systems 108, the authentication computing system 109, the one or more database(s) 116, the distributed ledger computing device 122, the client computing system 120, the distributed ledger computing system 124, the credit card processing system 127, the one or more user devices 110, and/or the other devices/systems in the computing environment 100 may, in some instances, be and/or include server computers, desktop computers, laptop computers, tablet computers, smart phones, wearable devices, or the like that may comprised of one or more processors, memories, communication interfaces, storage devices, and/or other components. Any and/or all of the smart glass computing device 104, the one or more application systems 108, the authentication computing system 109, the one or more database(s) 116, the distributed ledger computing device 122, the client computing system 120, the distributed ledger computing system 124, the credit card processing system 127, the one or more user devices 110, and/or the other devices/systems in the computing environment 100 may, in some instances, be and/or comprise special-purpose computing devices configured to perform specific functions.

Figure 1B:
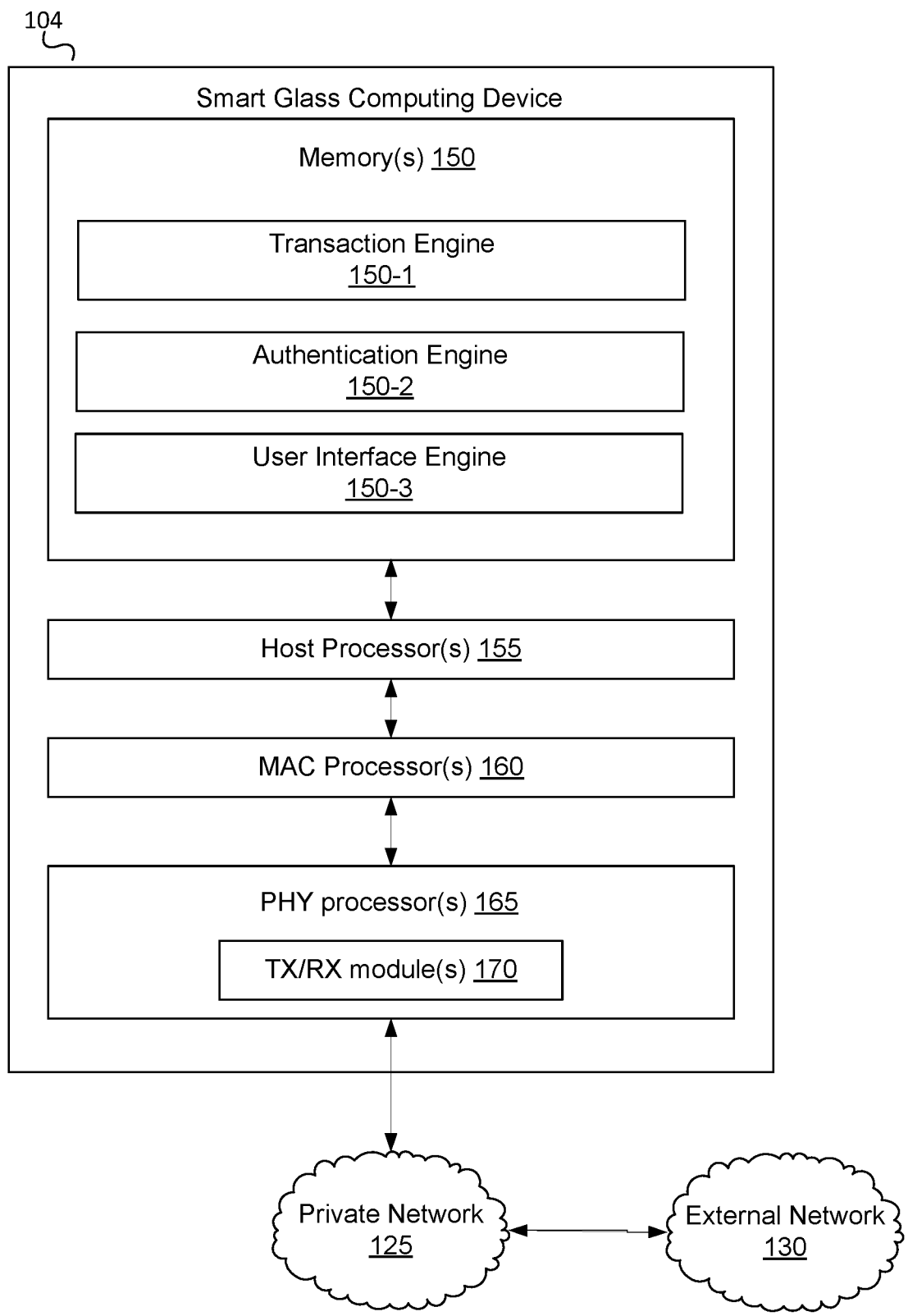
FIG. 1B shows an illustrative computing platform enabled for smart glass implementation of a dynamic NFT to facilitate touchless transactions, in accordance with one or more aspects described herein.

FIG. 1B shows an illustrative smart glass computing device 104 in accordance with one or more examples described herein. The smart glass computing device 104 may be a stand-alone device and/or may at least be partial integrated with the development computing system 104 may comprise one or more of host processor(s) 155, medium access control (MAC) processor(s) 160, physical layer (PHY) processor(s) 165, transmit/receive (TX/RX) module(s) 170, memory 150, and/or the like. One or more data buses may interconnect host processor(s) 155, MAC processor(s) 160, PHY processor(s) 165, and/or Tx/Rx module(s) 170, and/or memory 150. The smart glass computing device 104 may be implemented using one or more integrated circuits (ICs), software, or a combination thereof, configured to operate as discussed below. The host processor(s) 155, the MAC processor(s) 160, and the PHY processor(s) 165 may be implemented, at least partially, on a single IC or multiple ICs. The memory 150 may be any memory such as a random-access memory (RAM), a read-only memory (ROM), a flash memory, or any other electronically readable memory, or the like.

Messages transmitted from and received at devices in the computing environment 100 may be encoded in one or more MAC data units and/or PHY data units. The MAC processor(s) 160 and/or the PHY processor(s) 165 of the smart glass computing device 104 may be configured to generate data units, and process received data units, that conform to any suitable wired and/or wireless communication protocol. For example, the MAC processor(s) 160 may be configured to implement MAC layer functions, and the PHY processor(s) 165 may be configured to implement PHY layer functions corresponding to the communication protocol. The MAC processor(s) 160 may, for example, generate MAC data units (e.g., MAC protocol data units (MPDUs)), and forward the MAC data units to the PHY processor(s) 165. The PHY processor(s) 165 may, for example, generate PHY data units (e.g., PHY protocol data units (PPDUs)) based on the MAC data units. The generated PHY data units may be transmitted via the TX/RX module(s) 170 over the private network 155. Similarly, the PHY processor(s) 165 may receive PHY data units from the TX/RX module(s) 165, extract MAC data units encapsulated within the PHY data units, and forward the extracted MAC data units to the MAC processor(s). The MAC processor(s) 160 may then process the MAC data units as forwarded by the PHY processor(s) 165.

One or more processors (e.g., the host processor(s) 155, the MAC processor(s) 160, the PHY processor(s) 165, and/or the like) of the smart glass computing device 104 may be configured to execute machine readable instructions stored in memory 150. The memory 150 may comprise (i) one or more program modules/engines having instructions that when executed by the one or more processors cause the smart glass computing device 104 to perform one or more functions described herein and/or (ii) one or more databases that may store and/or otherwise maintain information which may be used by the one or more program modules/engines and/or the one or more processors. The one or more program modules/engines and/or databases may be stored by and/or maintained in different memory units of the smart glass computing device 104 and/or by different computing devices that may form and/or otherwise make up the smart glass computing device 104. For example, the memory 150 may have, store, and/or comprise a transaction engine 150-1, an authentication engine 150-2, a user interface engine 150-3 and/or the like. The transaction engine 150-1 may have instructions that direct and/or cause the smart glass computing device 104 to perform one or more operations associated with performance of a frictionless transaction with a publicly accessible computing device, such as an ATM or a point of sale computing system, and the like. The authentication engine 150-2 may have instructions that may cause the smart glass computing device to facilitate authentication of a user via a blockchain and/or other distributed ledger based on a dynamically generated NFT. The user interface engine 150-3 may have instructions that may cause the smart glass computing device to generate a user interface (e.g., a visual interface, an audio interface, a haptic interface, or a combination) to facilitate an ability of the user of the smart glass computing device 104 to conduct a frictionless transaction at a publicly accessible computing device.

Figure 2:
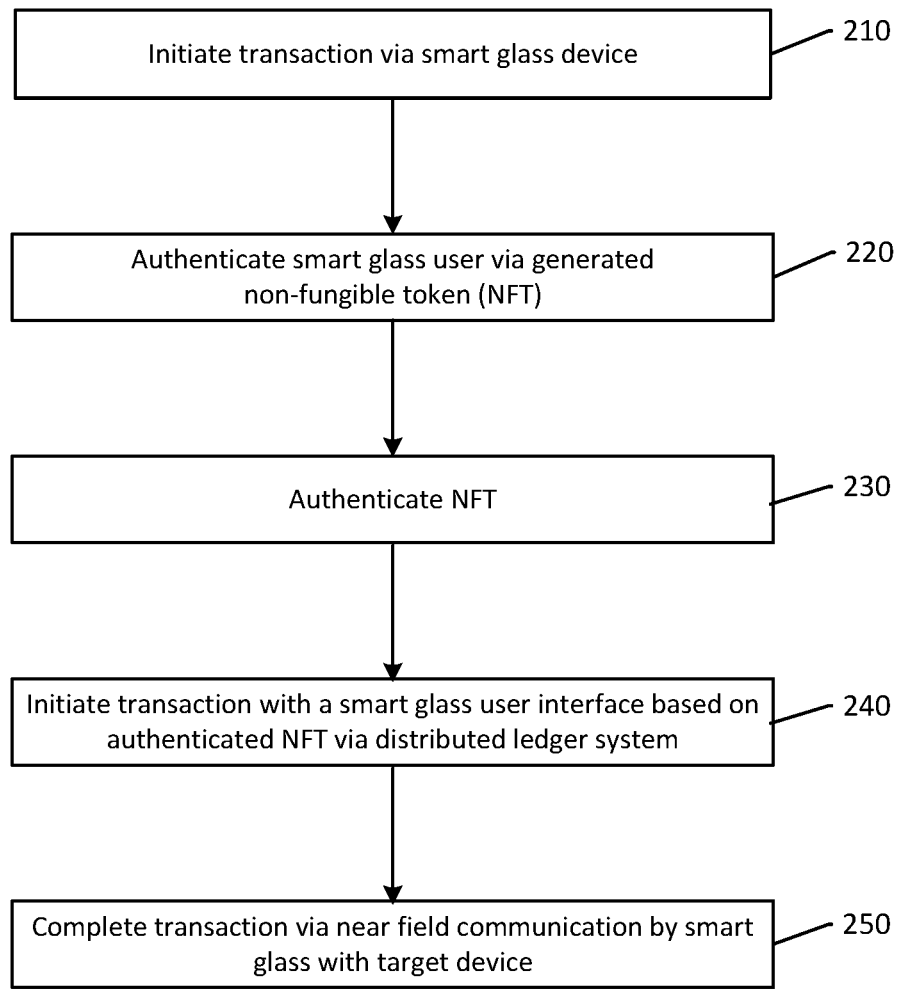
FIG. 2 shows an illustrative method illustrative method for smart glass use of a dynamic NFT to facilitate touchless transactions in accordance with one or more aspects described herein.

FIG. 2 shows an illustrative method illustrative method for smart glass use of a dynamic NFT to facilitate touchless transactions in accordance with one or more aspects described herein. At 210, a transaction may be initiated by a user via an application running on a smart glass device. For instance, the user may access a banking application and initiate a financial transaction (e.g., a withdrawal action or a deposit action) at an ATM. The ATM may be located locally to the user of the smart glass device or may be at a remote location. The banking application may also be used to pre-stage the transaction so that the user may finalize the transaction without physical interaction with the ATM, other than inserting a deposit or taking cash from the ATM. In some cases, the smart glass device may use near field communication or another communication network to initiate a purchase (or return) action at a merchant involving the merchant's point of sale computing system. In some cases, the merchant point of sale system and the smart glass device may perform a transaction with or without use of a physical credit or debit card. For instance, the smart glass device may access a virtual wallet storing information associated with one or more credit cards or debit cards of the user.

At 220, the smart glass device may be used to facilitate user identification and authorization to perform a financial transaction, either at an ATM or the merchant's point of sale system. In some cases, the smart glass device, upon initiation of the transaction (or logging into a financial application such as a banking application, a merchant sales application and/or the like), generates an NFT via communication with a distributed ledger system (e.g., a blockchain system, a Holochain system, and the like). The NFT may be based on identifying information associated with the smart glass device, the user of the smart glass device, a current time, and a geographical location captured by the smart glass device (e.g., such as by a global positioning system, a communications network, or other location identifying information such as an RFID, a visual landmark or the like). At 230, the NFT may be authenticated via the blockchain network by one or more authentication systems, such as a financial institution authentication system, a credit card agency authentication system, and the like. The authentication system may compare the NFT information with stored identification information associated with the user. For example, the NFT may include user biometric information that may be validated by the one or more authentication systems, alone or in combination with the other NFT information. At 240, the user of the smart glass device may initiate a transaction via the smart glass user interface based on a successful authenticated NFT, such as by receiving notification of an authentication via the distributed ledger system (e.g., an added new authorization block to a block chain). The smart glass device may present one or more user interface screens that may be navigated via eye movements and/or eye blinks. In some cases, such as for visually disabled individuals, a haptic interface may be used with or without audio information presented and/or received by the smart glass device. At 250, the transaction may be completed via near field communication between the smart glass device and an ATM, or a merchant point of sale system. For example, the user may have pre-staged a cash withdrawal from a particular ATM. When the user nears the ATM wearing the smart glass device, the smart glass device may communicatively connect to the ATM via a communication network, such as near field communication, Bluetooth, WiFi, a telecommunications network, and/or the like. Once connected, one or both of the smart glass device and the ATM may authenticate the device id, as set up during the pre-staging of the electronic transaction. For example, the ATM may authenticate the smart glass device, and/or the user, via use of an NFT via the blockchain, such as the NFT used to initiate the transaction. Once validate, the ATM may issue the cash via a cash dispenser. Similar operation may be performed in case of a deposit, where the ATM may receive the user's deposit via an input device.

Figure 3:
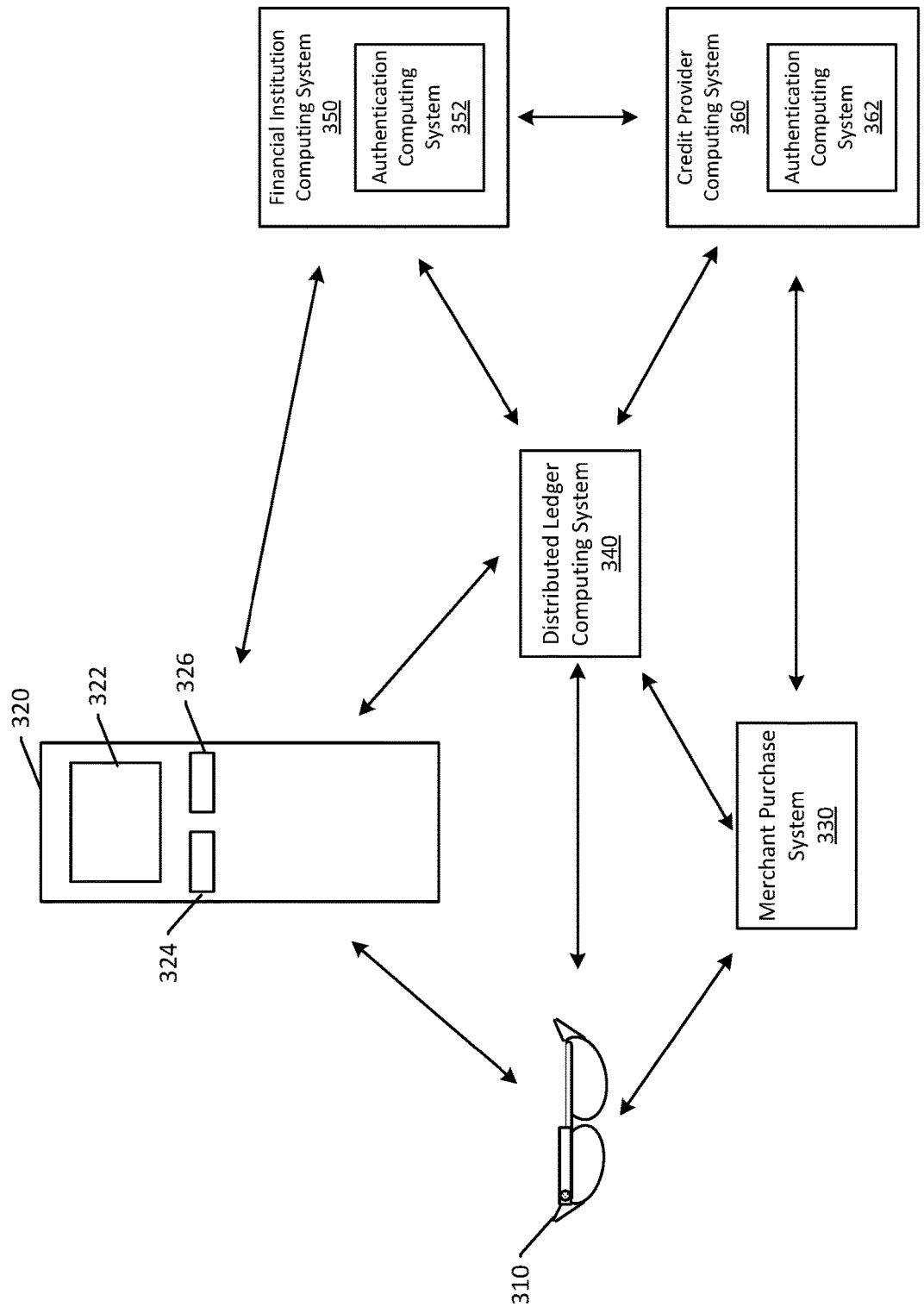
FIG. 3 show an illustrative block diagram overview of for smart glass implementation of a dynamic NFT via a distributed ledger, in accordance with one or more example arrangements.

FIG. 3 show an illustrative block diagram overview of for smart glass implementation of a dynamic NFT via a distributed ledger, in accordance with one or more example arrangements. The smart glass 310 may process a dynamically customized application that may be configured to generate a non-fungible token (NFT) based on biometric information (e.g., an iris image), geographical coordinates captured by a geographic location device associated with the smart glass (e.g., a global positioning system (GPS), a telecommunications network interface, and the like) and a timestamp. The NFT may be stored by using a distributed ledger system 340 for secure and immutable access by other devices and/or computing systems, such as the ATM 320 and the merchant purchase system 330 (e.g. a point of sale computing device, and the like) and/or one or more remote authentication systems 352, 362 associated with a financial organization (e.g., a financial organization associated with the ATM 320 and/or a credit provider computing system 360 providing credit and/or debit cards. The user of the smart glass 310 may desire to perform a financial transaction via the ATM 320, where details of the transaction may be viewed on an optional display device 322 and where deposits may be provided via an input device 324 and cash may be provided by the ATM 320 via the cash dispenser 326. Secure and immutable user identification and authorization may be provided via use of the NFT and the blockchain, or other distributed ledger systems. In some cases, the NFT may further include a smart glass device identifier that may be used to uniquely identify the smart glass device used by the user during a transaction.

The smart glass device 310 may process a dynamically customized application to configure an NFT for use to facilitate a transaction. An eye blink may be used for dynamic iris capture, so that an image of the user's eye components (e.g., the iris, pupil, and the like), where the image of the eye may be used to capture biometric information unique to the user. For example, the smart glass may capture an image of the user's eye, where an eye blink may trigger capture initiation and/or ending of the image capture. Once captured, the smart glass biometric capture application may detect the iris and/or an eyelid of the user within the captured image, where the iris information may be extracted and digitized. The iris image may be encoded and normalized to remove artifacts associated with other components of the user's eye, such as an eye lid and eye lashes. The iris image may be captured and encoded in an NFT stored in an authentication blockchain associated with the user, where the iris image may be used to positively identify the user or to identify whether another individual is attempting to imitate the user.

Figure 4:
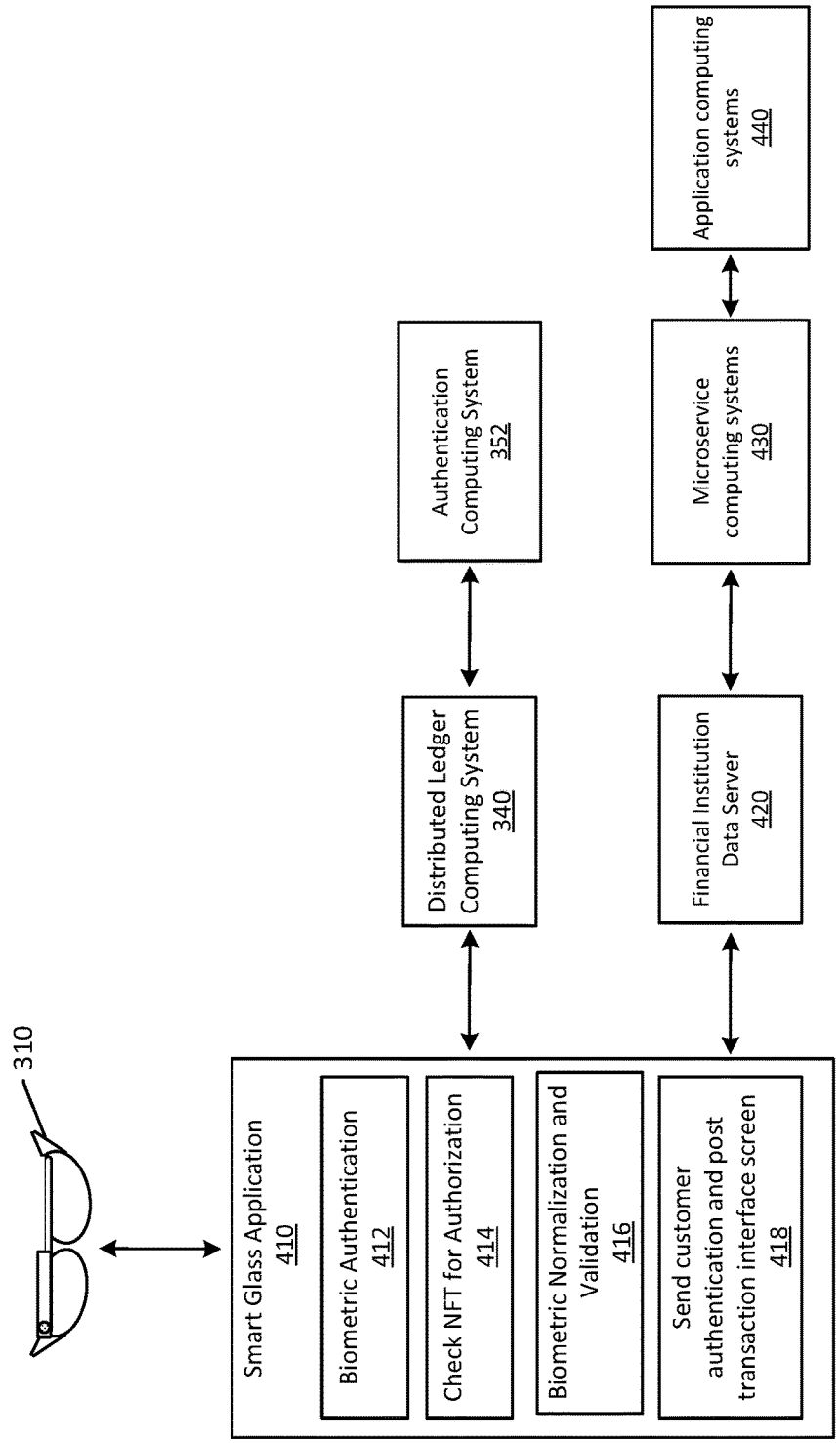
FIG. 4 shows an illustrative example showing an overview of integration of a dynamic NFT with a smart glass device and a financial organization computing system via a distributed ledger system in accordance with one or more aspects described herein.

FIG. 4 shows an illustrative example showing an overview of integration of a dynamic NFT with a smart glass device and a financial organization computing system via a distributed ledger system in accordance with one or more aspects described herein. As discussed above, the smart glass device 310 may process a smart glass application 410 to facilitate generation and use of an NFT for secure user identification and authorization such that secure frictionless or touchless transactions may be performed, for example, at an ATM or a merchant point of sale computing system. In some cases, the application 410 may be used for online purchasing operations as well through a merchant web-based or application-based point of sale system. The smart glass application 410 may first perform activities for biometric authentication of the smart glass user at 412. For example, the smart glass device 410 may capture an image of the user's eye to capture iris information for use as, at least a portion of, biometric information. In some cases, the smart glass device may include a microphone capable of capturing audio samples of the user's voice. The audio clips and iris information are examples of different biometric information that may be captured and used when generating the NFT. Once captured, the smart glass application 410 may generate an NFT based on the captured biometric information, captured geolocation information, and a time stamp. In some cases, other identification information may be included such as a smart glass device identifier, such as a serial number, a machine identification number, and the like. Once generated, the NFT may be communicated via a distributed ledger computing system 340 for inclusion, for example, as a block in a blockchain. In some cases, each transaction request has a corresponding NFT generated and added to a block chain associated with the smart glass device and/or the user of the smart glass device, to provide an immutable record of authorization requests. Such information may be used, for example, to determine whether another user attempted to imitate the smart glass user to make a purchase via the smart glass device 310. In some cases, smart glass device 310 may have a single associated authorized user and/or may have multiple users authorized. In some cases, a same smart glass device 310 may be used by multiple individuals, but the biometric information facilitates access to a particular blockchain associated with a particular user.

Once the NFT block is generated on the blockchain, the authentication system of the financial institution (e.g., authentication computing system 352, 362) may process the NFT to authenticate the user. Once authentication has been performed, or before authentication has been performed, biometric normalization and validation may be performed on the biometric information captured from the user at 416. At 418, once authentication has been performed, the authentication computing system 352 may communicate the user authorization to the smart glass device 310, such as by generating a new authorization block on the blockchain and/or by directly communicating an authorization message via a communication network. Based on this authorization, the smart glass application 410 may project one or more user interface screens onto a user interface device to facilitate user interaction to perform or stage a financial transaction. In some cases, the user interface screens may be manipulated via eye movement and/or eye blinks. In some cases, haptic feedback may be provided and/or user input may be entered via an input switch and/or by acceleration input generated, for example, by tapping the smart glass device 310. The transaction information may be communicated to the financial organization computing system via a financial institution data server 420, which then may facilitate communications to various microservice computing systems 430 and/or application computing systems 440 to facilitate the desired financial transaction. The microservice computing systems 430 may include an authentication hub system, a mobile device validation system, a transaction request system, a funds availability query system, a dynamic code generation system, a messaging system, and the like. The application computing systems 440 may include a customer search engine, an account balance platform system, an electronic data records system, a web-based ATM engine, and/or the like.

Figure 5:
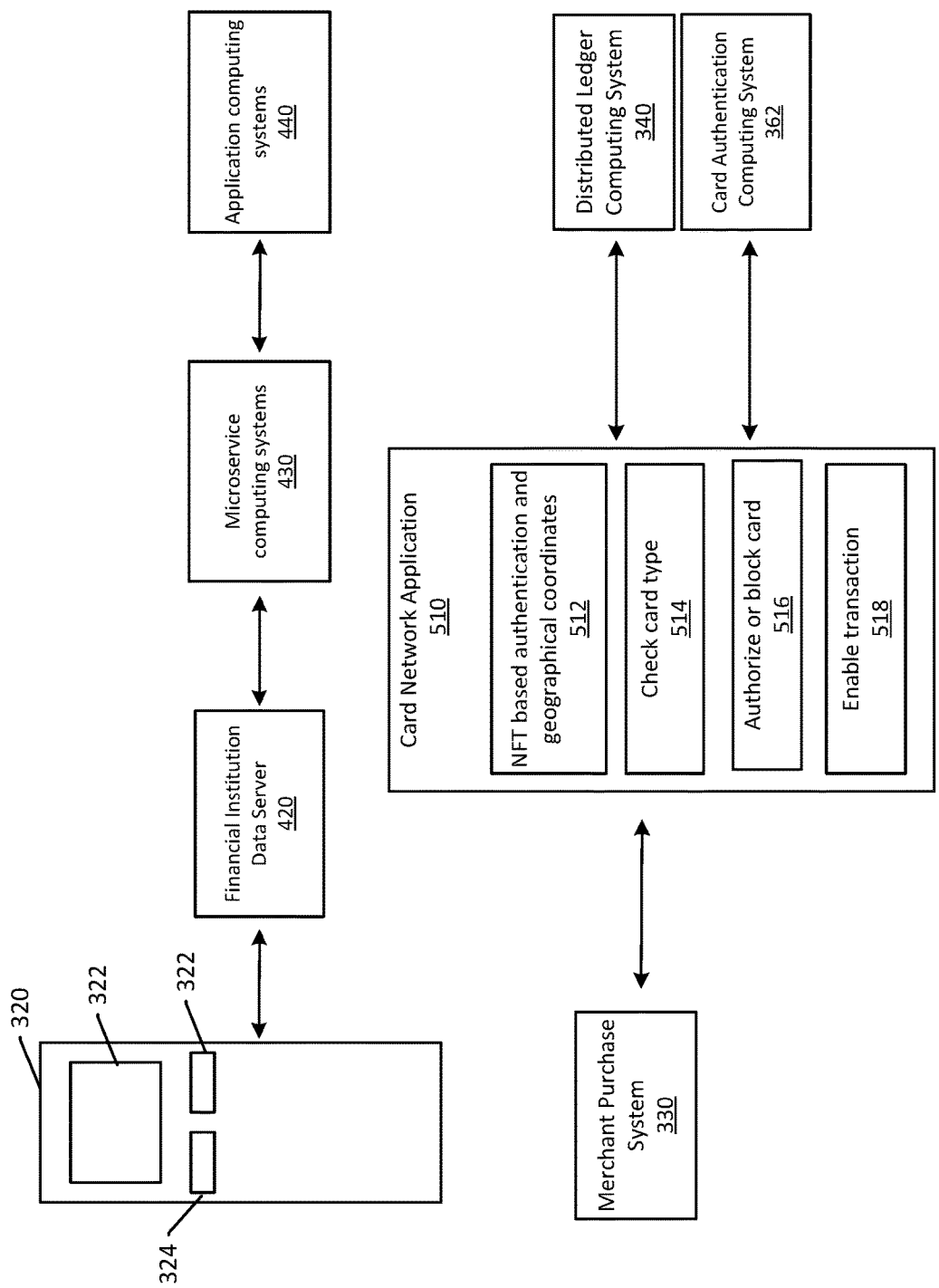
FIG. 5 shows an illustrative example showing an overview of frictionless point of sale transactions facilitated by a dynamic NFT via a distributed ledger system in accordance with one or more aspects described herein.

FIG. 5 shows an illustrative example showing an overview of frictionless transactions facilitated by a dynamic NFT via a distributed ledger system in accordance with one or more aspects described herein. In some cases, the ATM 320 may communicate via the financial institution data server 420 to the microservice computing systems 430 and/or the application systems 440. The user initiated transaction may be communicated to the ATM based on an ATM identifier and/or a geographical location as specified by the user. In some cases, the user may initiate a transaction near a geographical location of the ATM, where the ATM location may be matched to the geographical location in the NFT. In other cases, the user may initiate and pre-stage a transaction at a remotely located ATM, where the start location and the end location may both be included in the NFT for matching to confirm operation of the specified transaction.

The merchant purchase system 330 may process a credit card network application, such as to process a physical card, a scanned card, or an electronic representation of a card, where the card may be a credit card, a bank card, a debit card, a gift card, or other such card used for payments to purchase goods and/or services. The card network application at 512 may use the NFT based authentication and geographical location coordinates of the smart glass device and/or the merchant purchase system 330, where the NFT may be communicated to an authentication system (e.g., the authentication system 362) to authenticate the card and/or the user of the card via blockchain. Authentication of the user (either successful or unsuccessful) may be added to the blockchain as a new block. Once authenticated, the card type may be checked, such as to determine whether the card is a credit card or a debit card at 514. At 516, the card network application 510 may authorize or block the card based on the authentication and/or validation information stored in the blockchain. For example, the card may be authenticated, but a desired purchase may be over a credit limit, such that the purchase cannot be validated. If the transaction is determined to be invalid and/or if the card is unauthorized, then the purchase may be blocked. At 518, if the transaction is enabled, the transaction may be completed via the merchant purchase system 330.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. An apparatus comprising:
   a user interface;
   a processor; and
   non-transitory memory storing instructions that, when executed by the processor, cause the apparatus to:
   capture biometric information of a user of the apparatus;
   generate a non-fungible token (NFT) based on a combination of the biometric information, a geographic location and a time associated with the capture of the biometric information;
   cause, at a distributed ledger system and based on creation of the NFT, generation of an entry in a distributed ledger associated with the user and comprising a new authorization block;
   present, to the user via the user interface in response to addition of the new authorization block at the distributed ledger, a screen to enable a touchless transaction at a computing device in a vicinity of the apparatus, wherein proof of successful authentication of the user is presented to the user as the NFT via the user interface; and
   initiate, via a communication network and based on user interaction with the screen via eye movements, the touchless transaction at the computing device.

2. The apparatus of claim 1, wherein the instructions to capture the biometric information of the user of the apparatus causes the apparatus to capture an image of a portion of the user.

3. The apparatus of claim 2, wherein the instructions to cause capture of the image of the portion of the user comprises capturing an image of an eye of the user.

4. The apparatus of claim 1, wherein the biometric information comprises user iris information.

5. The apparatus of claim 1, further comprises a geolocation position capture device and wherein the instructions further cause the apparatus to:
   capture of the geographic location by the geolocation position capture device; and
   match the geographic location to a second geographical location of the computing device.

6. The apparatus of claim 5, wherein the geolocation position capture device comprises a global positioning system (GPS) device.

7. The apparatus of claim 1, wherein the distributed ledger comprises a blockchain.

8. The apparatus of claim 1, wherein the instructions further cause the apparatus to initiate, via a network connection, authentication of the user based on the NFT.

9. The apparatus of claim 1, wherein the apparatus is wearable by the user.

10. The apparatus of claim 1, wherein the apparatus comprises a smart glass device.

11. The apparatus of claim 1, wherein the touchless transaction comprises a cash withdrawal at a self-service transaction device.

12. The apparatus of claim 1, wherein the touchless transaction comprises a purchase of a product or service at a point of sale computing system.

13. A method comprising:
   capturing, by a wearable computing device, biometric information of a user of the wearable computing device;
   generating a non-fungible token (NFT) based on a combination of the biometric information, a geographic location and a time associated with the capture of the biometric information;
   causing, at a distributed ledger system and based on creation of the NFT, generation of an entry in a distributed ledger associated with the user and comprising a new authorization block;
   presenting, to the user via a user interface in response to addition of the new authorization block at the distributed ledger, a screen to enable a touchless transaction at a computing device in a vicinity of the wearable computing device, wherein proof of successful authentication of the user is presented to the user as the NFT via the user interface; and
   initiating, via a communication network and based on user interaction with the screen via eye movements, the touchless transaction at the computing device.

14. The method of claim 13, wherein capturing the biometric information of the user of the wearable computing device comprises capturing an image of a portion of the user.

15. The method of claim 13, wherein capturing an image of a portion of the user comprises capturing an image of an eye of the user.

16. The method of claim 13, wherein the biometric information comprises user iris information.

17. The method of claim 13, comprises capturing the geographic location by a geolocation position capture device associated with the wearable computing device and matching the geographic location to a second geographic location of the computing device.

18. The method of claim 17, wherein the geolocation position capture device comprises a global positioning system (GPS) device.

19. The method of claim 13, further comprising initiating, by the wearable computing device via a network connection, authentication of the user based on the NFT.

20. A system comprising: a wearable computing device comprising:
   a user interface;
   a processor; and
   non-transitory memory storing instructions that, when executed by the processor, cause the wearable computing device to:
   capture biometric information of a user of the wearable computing device;
   generate a non-fungible token (NFT) based on a combination of the biometric information, a geographic location associated with capture of the biometric information and a time associated with the capture of the biometric information, wherein generation of the NFT is based on a combination of the biometric information with the geographic location and a timestamp;

cause, at a distributed ledger system and based on creation of the NFT, generation of an entry in a distributed ledger associated with the user and comprising a new authorization block;

present, to the user via the user interface in response to addition of the new authorization validation block at the distributed ledger, a screen to enable a touchless transaction at a computing device in a vicinity of the wearable computing device, wherein proof of successful authentication of the user is presented to the user as the NFT via the user interface; and initiate, via a message sent by a communication network, the touchless transaction at the computing device and based on user interaction with the screen via eye movements, wherein the computing device completes the touchless transaction in response to the message sent by the wearable computing device.

* * * * *